US012623588B2

(12) United States Patent
Jeong

(10) Patent No.: US 12,623,588 B2
(45) Date of Patent: May 12, 2026

(54) LAMP CONTROL SYSTEM, LAMP CONTROL METHOD, AND VEHICLE

(71) Applicant: HYUNDAI MOBIS CO., LTD., Seoul (KR)

(72) Inventor: Seon Woo Jeong, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 3 days.

(21) Appl. No.: 19/035,282

(22) Filed: Jan. 23, 2025

(65) Prior Publication Data

US 2025/0332988 A1 Oct. 30, 2025

(30) Foreign Application Priority Data

Apr. 30, 2024 (KR) ........................ 10-2024-0057915

(51) Int. Cl.
*B60Q 1/14* (2006.01)
*B60Q 1/00* (2006.01)

(52) U.S. Cl.
CPC ........... *B60Q 1/143* (2013.01); *B60Q 1/0023* (2013.01); *B60Q 1/1407* (2013.01); *B60Q 2300/122* (2013.01); *B60Q 2300/142* (2013.01); *B60Q 2300/322* (2013.01); *B60Q 2300/335* (2013.01); *B60Q 2300/41* (2013.01)

(58) Field of Classification Search
CPC ..... B60Q 1/0023; B60Q 1/1407; B60Q 1/143
USPC .................................................. 362/465, 466
See application file for complete search history.

(56) References Cited

U.S. PATENT DOCUMENTS 6,049,749 A * 4/2000 Kobayashi ............... B60Q 1/18
362/276
2021/0237641 A1* 8/2021 Im ........................... B60K 35/23
2022/0340076 A1* 10/2022 Lim ......................... H04W 4/46
2023/0158941 A1* 5/2023 Sung .................... H05B 47/155
250/492.2

* cited by examiner

*Primary Examiner* — Thomas M Sember
(74) *Attorney, Agent, or Firm* — Morgan Lewis & Bockius LLP

(57) ABSTRACT

A lamp control system, a lamp control method, and a vehicle are disclosed. The lamp control system includes a lamp configured to form a light distribution (LV) in a front area including a driving lane; a sensing module configured to detect a change in the driving lane of a vehicle; and a processor configured to control the lamp so that a brightness distribution, a formation position, or a shape of the front area where the light distribution (LV) is formed is variable based on information about a driving lane change and information about a driver's driving tendency.

14 Claims, 9 Drawing Sheets

(a)

(b)

(b)

(a)

LAMP CONTROL SYSTEM, LAMP CONTROL METHOD, AND VEHICLE

This application claims the benefit of Korean Patent Application No. 10-2024-0057915, filed on Apr. 30, 2024, which is hereby incorporated by reference as if fully set forth herein.

BACKGROUND OF THE DISCLOSURE

Field of the Disclosure

Embodiments of the present disclosure are applicable to vehicles of all fields, and more particularly to a lamp control system for controlling light distribution formed in a front area including a driving lane, a lamp control method for the same, and a vehicle including the same.

Discussion of the Related Art

As the use of light emitting diode (LED) light sources in vehicle lamps continues to increase, various high beam and low beam vehicle lamp modules are on the rise. In particular, the trend of integrating high-low beam vehicle modules is becoming prominent. Such modules are well-received in the market due to the low cost, compact size, simple structure, and comprehensive functionality.

As the interest in safety during vehicle driving increases, a significant number of driving accidents occur each year due to the improper use of high beams. Vehicle lamp modules with adaptive driving beam (ADB) functionality may somewhat resolve contradictions in the use of high-low beams. Specifically, the vehicle lamp modules with ADB functionality may provide excellent visibility to vehicles and thus preventing glare for other drivers. The ADB function includes a smart control capability. That is, the ADB function may independently control each LED, thereby allowing for real-time control of the lighting area and brightness and effectively preventing glare for other vehicles and pedestrians.

Conventional vehicles with ADB functionality have been used in a way where the driver directly specifies a speed at which the ADB function is activated and the ADB function automatically activates when the vehicle is driving above the corresponding speed. However, the conventional method controls the lighting without considering the environment of a road where the vehicle is driving. This results in issues where the lighting becomes dimmer on relatively dark roads or brighter in relatively bright areas, hindering the visibility of pedestrians and other drivers. In addition, the ADB function may activate earlier than the driver desires, leading to numerous malfunctions due to camera recognition errors, or the ADB function may activate later than the driver desires, causing frustration for the driver.

In order to secure the visual field of a driver who rides in a vehicle, there exists technology related to a dynamic lane carpet, etc. that irradiates a carpet-shaped beam in front of the vehicle in a driving situation, but there is a problem that this technology is far from efficient in cost and function.

SUMMARY OF THE DISCLOSURE

Accordingly, the present disclosure is directed to a lamp control system, a lamp control method, and a vehicle that substantially obviate one or more problems due to limitations and disadvantages of the related art.

An object of the present disclosure is to provide a method for efficiently controlling light distribution according to the driver's driving tendency.

Another object of the present disclosure is to provide a method for transmitting the driver's intention of a subject vehicle to a following vehicle (i.e., a rear vehicle) by controlling distribution of light irradiated to a destination lane when changing lanes.

Technical subjects to be solved by the present disclosure are not limited to the above-mentioned technical solutions, and it should be noted that other technical subjects not described above can be understood by those skilled in the art from the description of the present disclosure below.

In accordance with an embodiment of the present disclosure, a lamp control system may include: a lamp configured to form a light distribution (LV) in a front area including a driving lane; a sensing module configured to detect a change in the driving lane of a vehicle; and a processor configured to control the lamp so that a brightness distribution, a formation position, or a shape of the front area where the light distribution (LV) is formed is variable based on information about a driving lane change and information about a driver's driving tendency.

The processor may be configured to, upon receiving the driving lane change information, control the front area to include a target lane corresponding to a destination lane from among adjacent lanes of the driving lane.

The processor may control brightness of an area where the LV is formed in the target lane from among the front area to be greater than brightness of an area where the LV is formed in the driving lane from among the front area.

The processor may control brightness distribution of an area where the LV is formed in the target lane from among the front area based on driver's lane change tendency information among the driver's driving tendency information.

The driver's lane change tendency information may be set based on a lighting-on signal of a turn signal light or a time taken for lane change.

The processor may control an area where the LV is formed in the target lane from among the front area to be located closer to the vehicle than an area where the LV is formed in the driving lane from among the front area.

The processor may control a formation position of an area where the LV is formed in the target lane from among the front area, based on driver's steering tendency information from among the driver's driving tendency information.

The driver's steering tendency information may be set based on either a frequency of the driver's lane departure when driving on a curved road or steering angle information with respect to the driving lane when driving on a curved road.

The processor may additionally control a brightness distribution, a formation position, or a shape of the front area where the LV is formed, based on a distance between the vehicle and a front vehicle, a distance between the vehicle and a rear vehicle, or a driving speed of the vehicle.

In accordance with another embodiment of the present disclosure, a lamp control method may include: forming, by a lamp, a light distribution (LV) in a front area including a driving lane; detecting a change in a driving lane of a vehicle; and controlling a brightness distribution, a formation position, or a shape of the front area where the LV is formed based on information about a driving lane change and information about a driver's driving tendency.

The controlling may include: upon receiving the driving lane change information, controlling the front area to include a target lane corresponding to a destination lane from among adjacent lanes of the driving lane.

The controlling may include: controlling brightness distribution of an area where the LV is formed in the target lane from among the front area based on driver's lane change tendency information among the driver's driving tendency information.

The processor may control a formation position of an area where the LV is formed in the target lane from among the front area, based on driver's steering tendency information from among the driver's driving tendency information.

In accordance with another embodiment of the present disclosure, a vehicle may include: a lamp configured to form a light distribution (LV) in a front area including a driving lane; a sensing module configured to detect a change in the driving lane of a vehicle; and a processor configured to control the lamp so that a brightness distribution, a formation position, or a shape of the front area where the light distribution (LV) is formed is variable based on information about a driving lane change and information about a driver's driving tendency.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION OF THE DISCLOSURE

Hereinafter, preferred embodiments of the present disclosure will be described in detail, examples of which are shown in the attached drawings. The detailed description below with reference to the attached drawings is intended to explain the preferred embodiments of the present disclosure, rather than representing only embodiments capable of being implemented according to the present disclosure. The following detailed explanation includes specific details to provide a thorough understanding of the embodiments. However, it is evident to those skilled in the art that the embodiments are capable of being practiced without these specific details.

Most of the terms used herein are selected from commonly used terms in the relevant field. However, some terms are arbitrarily chosen by the applicant, and the meanings thereof are detailed in the following description as needed. Therefore, the embodiments should be understood based on the intended meaning of the terms rather than the names or meanings thereof.

Figure 1:
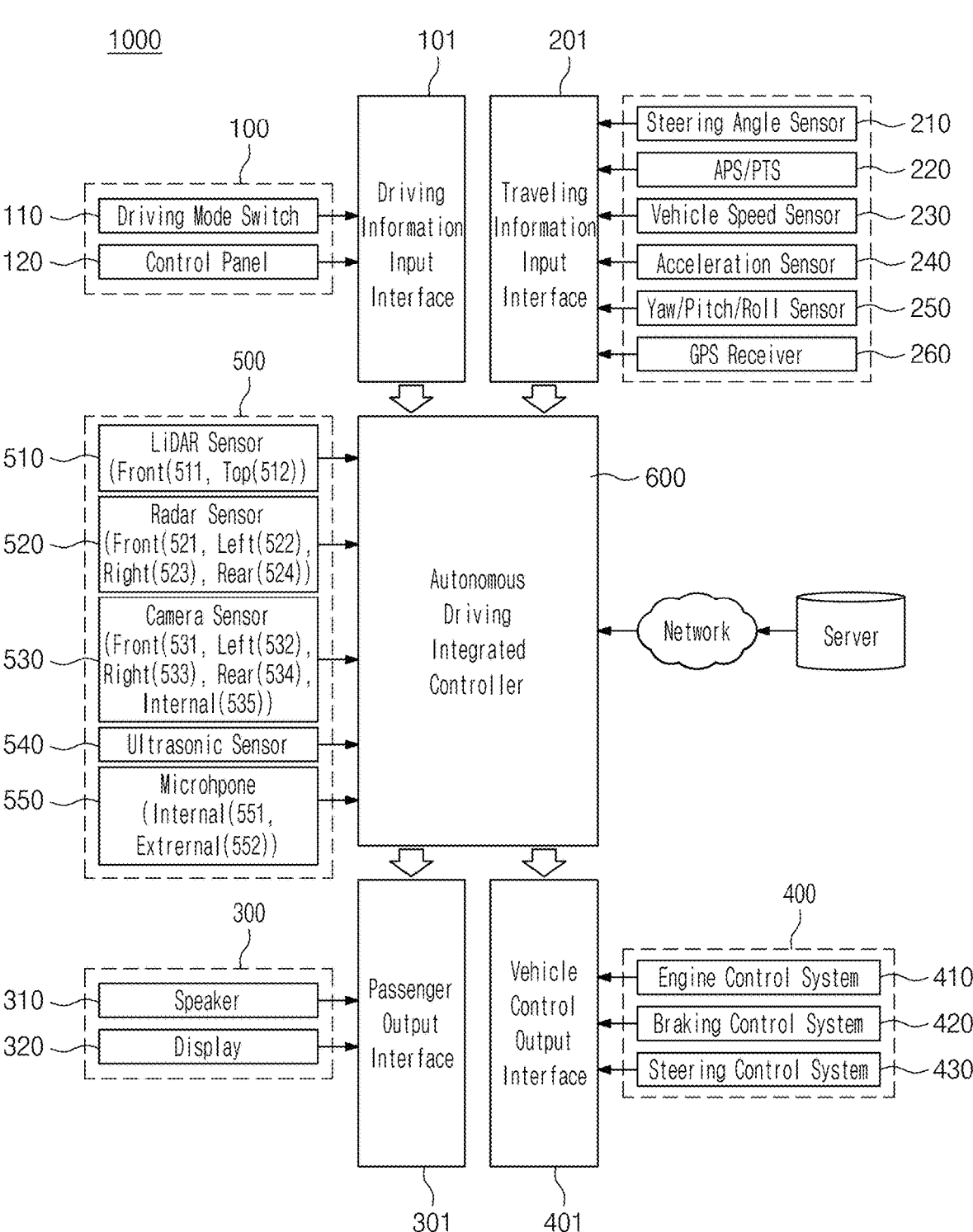
FIG. 1 is a block diagram of a vehicle system according to embodiments.
Figure 2:
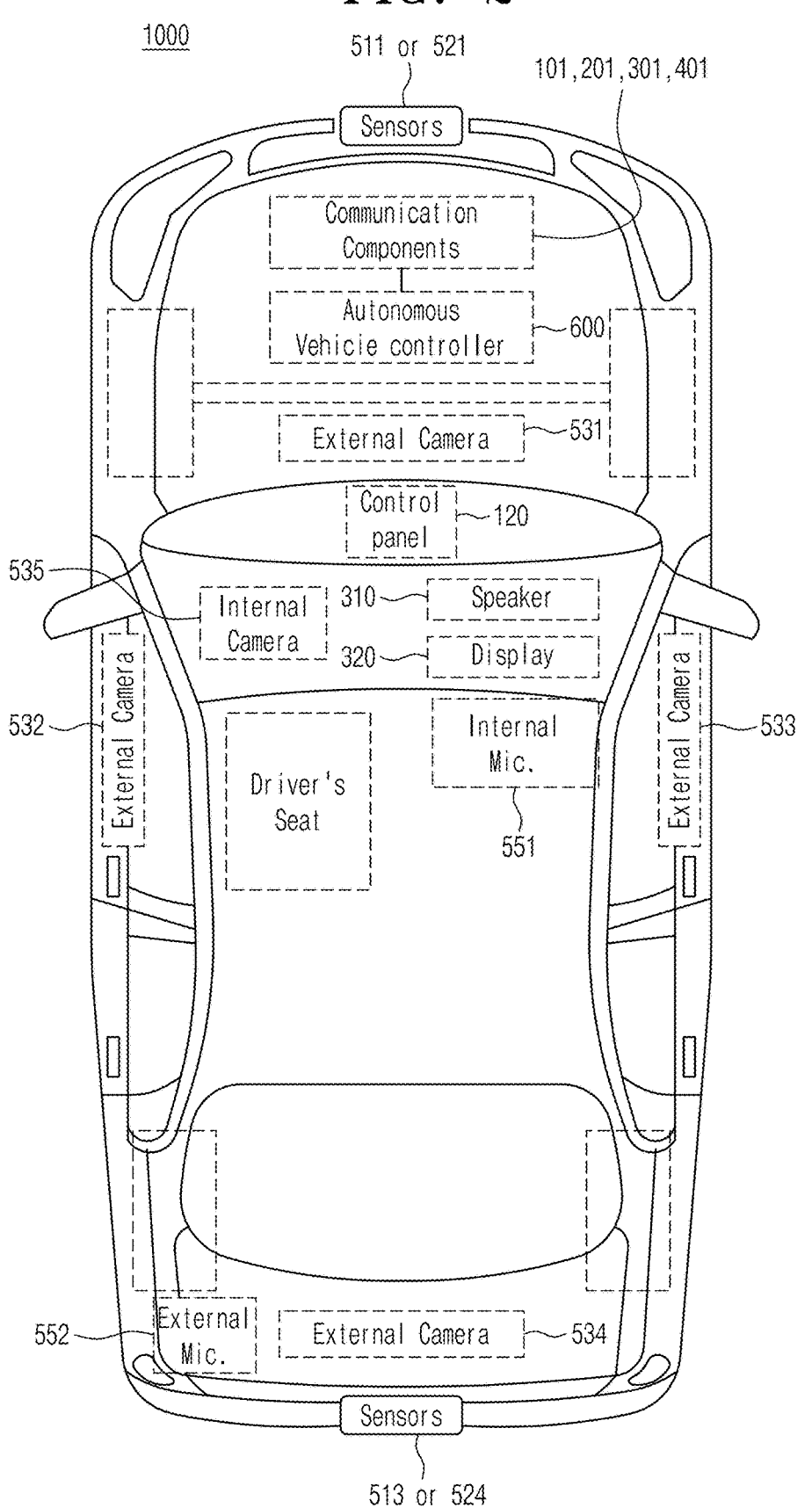
FIG. 2 is an illustrative diagram showing the structure of a vehicle according to embodiments.

FIG. 1 is a block diagram of a vehicle system according to embodiments. FIG. 2 is an illustrative diagram showing the structure of a vehicle according to embodiments.

FIG. 2 shows a vehicle having applied the vehicle system of FIG. 1.

The vehicle according to the embodiments may be configured as shown in FIG. 2 and can perform autonomous driving based on an autonomous driving control system. The vehicle according to the embodiments may be referred to as an autonomous vehicle, a robot, an urban air mobility (UAM), an autonomous driving apparatus, etc.

An autonomous vehicle 1000 may be implemented based on an autonomous driving integrated controller 600, which transmits and receives data necessary for autonomous driving control through a driving information input interface 101, a travelling information input interface 201, an occupant output interface 301, and an autonomous vehicle control output interface 401. However, in this specification, the autonomous driving integrated controller 600 may also be referred to as a processor, processors, or simply as a controller.

The autonomous driving integrated controller 600 may acquire, through the driving information input interface 101, driving information based on the operations of an occupant on the user input unit 100 in the autonomous driving mode or manual driving mode of the autonomous vehicle. As shown in FIG. 1, the user input unit 100 may include a driving mode switch 110 and a control panel 120 (e.g., a navigation device installed in the autonomous vehicle, a smartphone or tablet PC carried by the occupant, etc.). Accordingly, the driving information may include driving mode information and navigation information on the autonomous vehicle.

For example, the driving mode (i.e., autonomous driving mode/manual driving mode or sports mode/eco mode/safe mode/normal mode) of the autonomous vehicle, which is determined by the operation of the driving mode switch 110 by the occupant, may be transmitted to the autonomous driving integrated controller 600 through the driving information input interface 101 as the above-described driving information.

Navigation information such as an occupant destination and a route to the destination (e.g., the shortest route or preferred route selected by the occupant among candidate routes to the destination), which is input by the occupant through the control panel 120, may be transmitted to the autonomous driving integrated controller 600 through the driving information input interface 101 as the above-described driving information The control panel 120 may be implemented as a touch screen panel providing a user interface (UI) for the occupant to input or modify information for autonomous driving control of the autonomous vehicle. In this case, the aforementioned driving mode switch 110 may be implemented as a touch button on the control panel 120.

In addition, the autonomous driving integrated controller 600 may obtain travelling information indicating the driving state of the autonomous vehicle through the travelling information input interface 201. The travelling information may include various information indicating the driving states and behaviors of the autonomous vehicle, such as a steering angle formed when the occupant manipulates a steering wheel, an accelerator pedal stroke or brake pedal stroke formed when the occupant depresses an accelerator pedal or brake pedal, and behaviors of the vehicle including a vehicle speed, acceleration, a yaw, a pitch, and a roll formed in the vehicle. As shown in FIG. 1, each piece of the travelling information may be detected by the driving controller 200, which includes a steering angle sensor 210, an accelerator position sensor/pedal travel sensor (APS/PTS) 220, a vehicle speed sensor 230, an acceleration sensor 240, and a yaw/pitch/roll sensor 250.

The travelling information on the autonomous vehicle may also include information on the location of the vehicle, which may be obtained through a global positioning system (GPS) receiver 260 applied to the autonomous vehicle. The travelling information may be transmitted to the autonomous driving integrated controller 600 through the travelling information input interface 201 and then used to control the driving of the autonomous vehicle in the autonomous driving mode or manual driving mode.

The autonomous driving integrated controller 600 may transmit information on the driving state of the autonomous vehicle in the autonomous driving mode or manual driving mode, which is intended for the occupant, to an output unit 300 through the occupant output interface 301. In other words, the autonomous driving integrated controller 600 may transmit the information on the driving state of the autonomous vehicle to the output unit 300, enabling the occupant to check the autonomous or manual driving state of the vehicle based on the driving state information displayed through the output unit 300. The driving state information may include various information indicating the driving state of the autonomous vehicle, such as the current driving mode, gear range, vehicle speed, and so on.

If the autonomous driving integrated controller 600 determines that a warning is necessary for the occupant in the autonomous driving mode or manual driving mode, the autonomous driving integrated controller 600 may transmit warning information along with the aforementioned driving state information to the output unit 300 through the occupant output interface 301 to enable the output unit 300 to issue the warning to the occupant. To output the driving state information and warning information both audibly and visually, the output unit 300 may include a speaker 310 and a display device 320 as shown in FIG. 1. In this case, the display device 320 may be implemented as the same device as the aforementioned control panel 120 or as a separate and independent device.

The autonomous driving integrated controller 600 may transmit control information for driving control of the autonomous vehicle in the autonomous driving mode or manual driving mode to a lower control system 400 applied to the autonomous vehicle through the autonomous vehicle control output interface 401. As shown in FIG. 1, the lower control system 400 for driving control of the autonomous vehicle may include an engine control system 410, a braking control system 420, and a steering control system 430. The autonomous driving integrated controller 600 may transmit engine control information, braking control information, and steering control information as the control information to each lower control system 410, 420, and 430 through the autonomous vehicle control output interface 401. Accordingly, the engine control system 410 may control the vehicle speed and acceleration of the autonomous vehicle by increasing or decreasing the fuel supplied to the engine. The braking control system 420 may control the braking of the autonomous vehicle by adjusting the braking force. The steering control system 430 may control the steering of the autonomous vehicle through a steering device applied to the vehicle (e.g., motor driven power steering (MDPS) system).

As described above, the autonomous driving integrated controller 600 in this embodiment may obtain driving information based on the operations of the operation of the occupant and travelling information indicating the driving state of the autonomous vehicle through the driving information input interface 101 and the travelling information input interface 201, respectively. The autonomous driving integrated controller 600 may transmit driving state information and warning information, generated according to the autonomous driving algorithm, to the output unit 300 through the occupant output interface 301. Additionally, the autonomous driving integrated controller 600 may transmit control information, generated according to the autonomous driving algorithm, to the lower control system 400 through the autonomous vehicle control output interface 401 to enable the driving control of the autonomous vehicle.

To ensure stable autonomous driving of the autonomous vehicle, it is necessary to continuously monitor the driving state of the autonomous vehicle by accurately measuring the driving environment of the autonomous vehicle and control driving based on the measured driving environment. To this end, as illustrated in FIG. 1, an autonomous driving apparatus in this embodiment may include a sensing module 500 for detecting surrounding objects of the autonomous vehicle, such as other vehicles, pedestrians, roads, or fixed structures (e.g., traffic lights, signposts, traffic signs, construction fences, etc.).

The sensing module 500, as shown in FIG. 1, may include one or more of a light detection and ranging (LiDAR) sensor 510, a radar sensor 520, and a camera sensor 530 to detect surrounding objects outside the autonomous vehicle.

The LiDAR sensor 510 may detect a surrounding object outside the autonomous vehicle by transmitting a laser signal around the autonomous vehicle and receiving the signal reflected back from the object. The LiDAR sensor 510 may detect the surrounding object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the autonomous vehicle, respectively, but the installation location of each LiDAR sensor and the number of LiDAR sensors are not limited to a specific embodiment. A threshold for determining the validity of a laser signal reflected and returning from an object may be previously stored in a memory (not illustrated) of the autonomous driving integrated controller 600. The autonomous driving integrated controller 600 may determine the position (including the distance to the object), speed, and direction of movement of the object by measuring the time taken for the laser signal transmitted by the LiDAR sensor 510 to be reflected back from the object.

The radar sensor 520 may detect a surrounding object outside the autonomous vehicle by emitting an electromagnetic wave around the autonomous vehicle and receiving the signal reflected back from the object. The radar sensor 520 may detect the surrounding object located within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the autonomous vehicle, respectively, but the installation location of each radar sensor and the number of radar sensors are not limited to a specific embodiment. The autonomous driving integrated controller 600 may determine the position (including the distance to the object), speed, and direction of movement of the object by analyzing the power of an electromagnetic wave transmitted and received by the radar sensor 520.

The camera sensor 530 may detect a surrounding object outside the autonomous vehicle by capturing an image of the area around the vehicle. The camera sensor 530 may detect the surrounding object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the autonomous vehicle, respectively, but the installation location of each camera sensor and the number of camera sensors are not limited to a specific embodiment. The autonomous driving integrated controller 600 may determine a location (including a distance to a corresponding object), speed, and moving direction of the corresponding object by applying predefined image processing to an image captured by the camera sensor 530. The autonomous driving integrated controller 600 may determine the position (including the distance to the object), speed, and direction of movement of the object by applying a predefined image processing algorithm to the image captured by the camera sensor 530.

In addition, an internal camera sensor 535 for capturing the inside of the autonomous vehicle may be mounted at a predetermined location (e.g., rearview mirror) inside the vehicle. The autonomous driving integrated controller 600 may monitor the behavior and state of the occupant based on an image captured by the internal camera sensor 535 and provide guidance or warnings to the occupant through the output unit 300.

In addition to the LiDAR sensor 510, radar sensor 520, and camera sensor 530, the sensing module 500 may also include an ultrasonic sensor 540 as shown in FIG. 1. Further, various types of sensors for detecting surrounding objects of the autonomous vehicle may be further employed in the sensing module 500.

For better understanding of this embodiment, FIG. 2 illustrates an example where the front LiDAR sensor 511 or front radar sensor 521 is installed at the front of the autonomous vehicle, the rear LiDAR sensor 513 or rear radar sensor 524 is installed at the rear of the autonomous vehicle, and the front camera sensor 531, left camera sensor 532, right camera sensor 533, and rear camera sensor 534 are installed at the front, left, right, and rear of the autonomous vehicle, respectively. However, as described above, the installation position of each sensor and the number of sensors are not limited to a specific embodiment.

To assess the condition of the occupant in the autonomous vehicle, the sensing module 500 may also include a biometric sensor to detect biological signals of the occupant (e.g., heart rate, electrocardiogram, respiration, blood pressure, body temperature, brain waves, blood flow (pulse wave), and blood sugar). The biometric sensors may include a heart rate sensor, electrocardiogram sensor, respiration sensor, blood pressure sensor, body temperature sensor, electroencephalogram sensor, photoplethysmography sensor, and blood sugar sensor.

The sensing module 500 additionally includes a microphone 550. In particular, an internal microphone 551 and an external microphone 552 may be used for different purposes, respectively.

The internal microphone 551 may be used, for example, to analyze the voice of the occupant in the autonomous vehicle 1000 based on artificial intelligence (AI) or to respond immediately to direct voice commands.

On the other hand, the external microphone 552 may be used, for example, to appropriately respond to safe driving by analyzing various sounds generated from the outside of the autonomous driving vehicle 1000 based on various analysis tools such as deep learning.

For reference, the symbols illustrated in FIG. 2 may perform the same or similar functions as those illustrated in FIG. 1. FIG. 2 illustrates a relative positional relationship of each component (based on the interior of the autonomous driving vehicle 1000) in more detail compared to FIG. 1.

Figure 3:
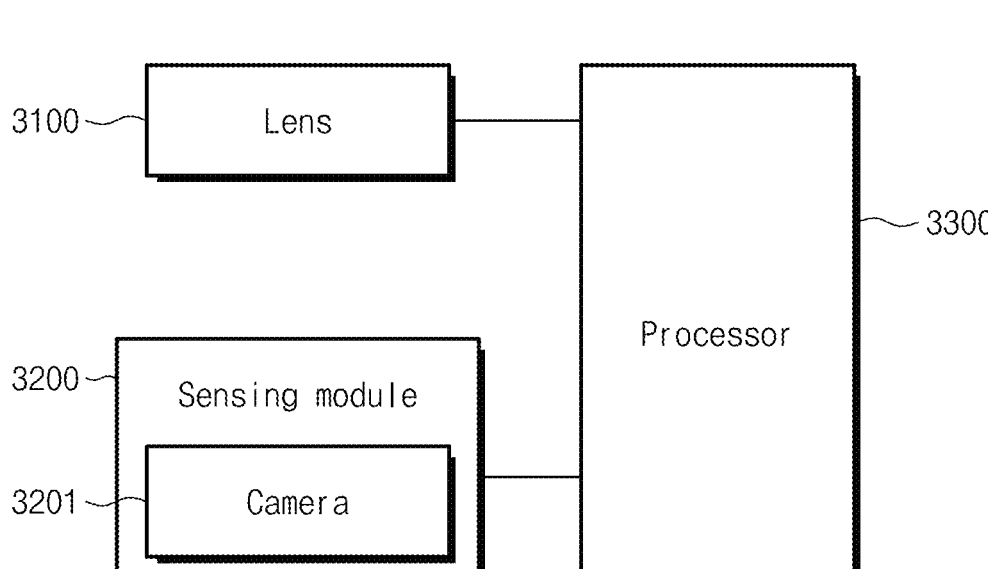
FIG. 3 illustrates a lamp control system according to embodiments.

FIG. 3 is a block diagram illustrating a lamp control system according to the embodiments of the present disclosure.

A sensing module 3200 illustrated in FIG. 3 may correspond to the sensing module 500 illustrated in FIG. 1. The processor 3300 illustrated in FIG. 3 may correspond to the autonomous driving integrated controller 600 illustrated in FIG. 1.

Referring to FIG. 3, the lamp control system 3000 according to the embodiments may include a lamp 3100, a sensing module 3200, and a processor 3300.

The lamp 3100 is a type of an output unit that emits light in the front direction of the vehicle and may be implemented as a pair of lamps 3101. More specifically, the lamp 3100 may be a type of a headlamp implemented as two headlamps respectively installed at the left front side and the right front side of the vehicle. In general, the headlamps or headlights may include a low beam, a high beam, a turn signal light, a daytime running light, a side light, etc. Among the above headlamps or headlights, it may be preferable that the lamp 3100 controlled by the processor 3300 of the lamp control system 3000 correspond to a high beam or a low beam.

The lamp 3100 may form a light distribution (hereinafter referred to as "LV") in the front area including a driving lane. That is, the lamp 3100 may additionally form the LV in the front area of the driving vehicle to enhance the driver's visibility. For example, the lamp 3100 may form a carpet-shaped LV in the front area of the vehicle. A detailed description thereof will be given below with reference to FIG. 4.

The sensing module 3200 may detect whether a driving lane of the vehicle is changed. That is, the sensing module 3200 may detect a lane change situation in which the currently driving vehicle attempts to change a current driving lane to another adjacent lane. For example, the sensing module 3200 may correspond to a camera 3201 that detects or photographs a lane corresponding to the driving lane, and the camera 3201 may correspond to the camera sensor 530 illustrated in FIGS. 1 and 2. Alternatively, for example, the sensing module 3200 may correspond to a driving information detection sensor that detects lane change information of the vehicle among various pieces of information indicating a driving status or behavior of the vehicle, and the driving information detection sensor may correspond to a steering angle sensor 210, an APS (Accelerator Position Sensor)/PTS (Pedal Travel Sensor) 220, a vehicle speed sensor 230, an acceleration sensor 240, a yaw/pitch/roll sensor 250, etc., as shown in FIGS. 1 and 2.

The sensing module 3200 and the processor 3300 may be connected to each other as an interface unit. That is, the interface unit may transmit driving lane change information detected by the sensing module 3200 to the processor 3300. Additionally, the interface unit may also transmit the status of the lamp 3100 to the processor 3300.

The processor 3300 may transmit/receive driving lane change information from the sensing module 3200, and may control the lamp 3100 so that a brightness distribution, a formation position, and/or a shape of the front area where the LV is formed are variable based on the driving lane change information.

In addition, the processor 3300 may control the lamp 3100 so that the brightness distribution, formation position, and/or shape of the front area where the LV is formed are variable based on the driver's driving tendency information. The driver's driving tendency information may include driver's lane change tendency information and driver's steering tendency information.

The driver's lane change tendency information may indicate a tendency of the driver to change driving lanes, and may be set based on the turn signal light signal information or the time required for lane change. That is, when the driver intends to change lanes in normal times, the processor 3300 may transmit/receive information about whether the turn signal light is turned on or information about how much time is required for lane change, and may store the received information in the memory described in FIGS. 1 and 2. In addition, the processor 3300 may determine the driver's lane change tendency information based on the information stored in the memory about whether the driver normally changes driving lanes, whether the turn signal light is turned on, or how much time is required for lane change. A method for controlling the lamp 3100 of the processor 3300 depending on the driver's lane change tendency information will be described later with reference to FIG. 6.

The driver's steering tendency information is a tendency indicating a steering angle of the steering wheel operated by the driver, and may be set based on either the frequency of the driver's lane departure when driving on a curved road or the steering angle information with respect to the lane when driving on a curved road. That is, the processor 3300 may transmit/receive information about how many times the driver's vehicle deviates from the lane forming the driving lane when driving on a curved road in normal times, and information about the degree of error(s) between the lane forming the driving lane and the steering angle of the vehicle, and may store the information in the memory described in FIGS. 1 and 2.

In addition, when the driver stored in the memory travels on the curved road in normal times, the processor 3300 may determine the driver's steering tendency information based on not only the information about how many times the driver's vehicle deviates from the lane forming the driving lane, but also information about the degree of error(s) between the lane forming the driving lane and the steering angle of the vehicle. A method for controlling the lamp 3100 of the processor 3300 depending on the driver's steering tendency information will be described later with reference to FIG. 8.

Figure 4:
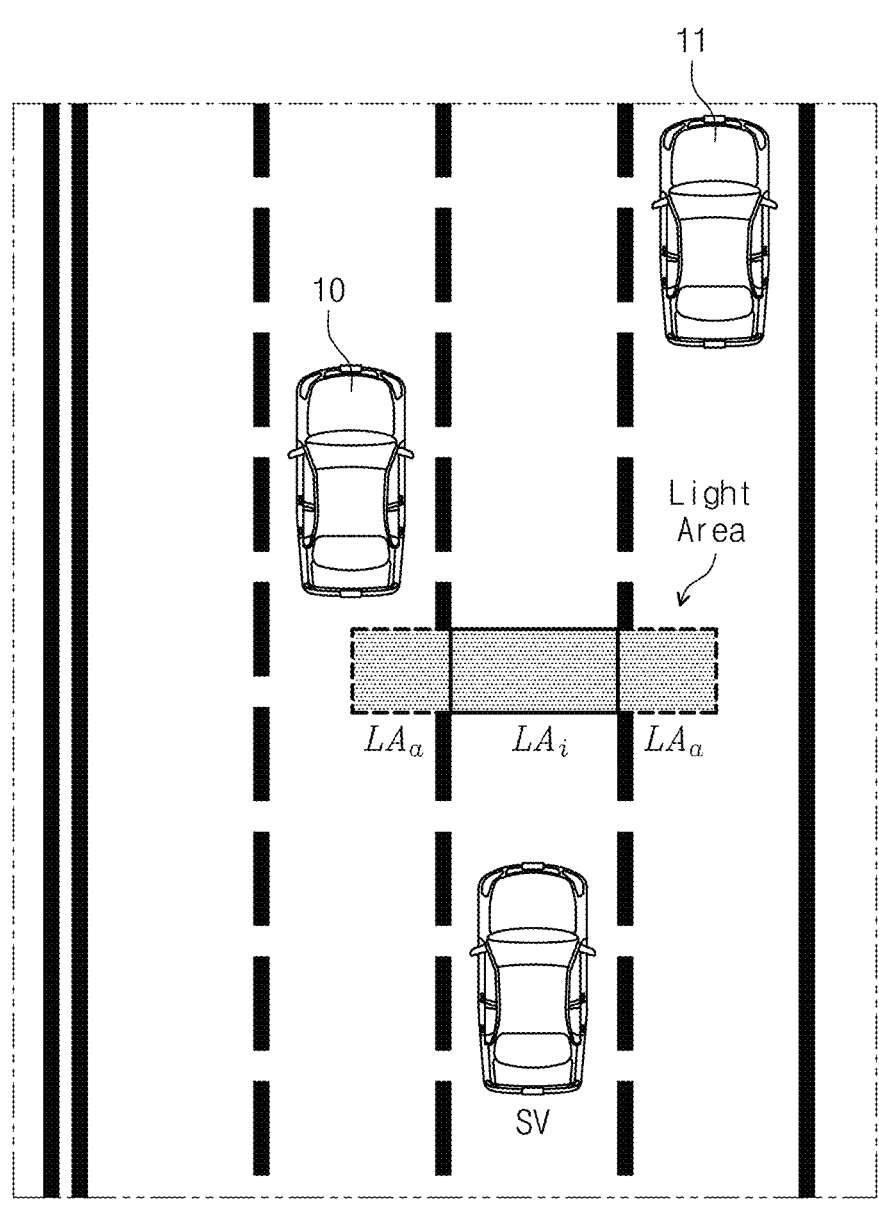
FIG. 4 is a diagram illustrating a front area of a vehicle according to the embodiments of the present disclosure.

FIG. 4 is a diagram illustrating the front area of the vehicle according to the embodiments of the present disclosure.

The subject vehicle (SV) (hereinafter referred to as "SV") illustrated in FIG. 4 is a vehicle equipped with a lamp control system 3000, and the lamp control system 3000 may correspond to the lamp control system 3000 of FIG. 3, and the vehicle may correspond to the vehicles of FIGS. 1 and 2.

Referring to FIG. 4, the SV may form a light distribution (LV) in the front area including a driving lane. As described with reference to FIG. 3, the LV is formed by the lamp 3100 additionally emitting a beam to the front area to enhance the driver's field of view, and may be formed in various shapes. For convenience of explanation, the front area where the LV is formed will hereinafter be described as a light area.

The LV may be formed in the front area including the driving lane. More specifically, the front area (hereinafter referred to as a "light area") where LV is formed may include a first front area (hereinafter referred to as a light area ($LA_i$) formed in the driving lane) where LV is formed in the driving lane, and a second front area (hereinafter referred to as a light area ($LA_a$) formed in an adjacent lane) where LV is formed in an adjacent lane of the driving lane.

The width of the light area ($LA_i$) formed in the driving lane may be formed to be the same as the width of the driving lane, that is, the LV may cover the entire area of the driving lane. The width of the light area ($LA_a$) formed in the adjacent lane may be formed to be the same as the width of the adjacent lane or smaller than the width of the adjacent lane. In other words, the LV may cover the entire area of the adjacent lane or only a part of the entire area.

In addition, the light area (Light Area) may be formed based on the distance between the SV and the front vehicles (10, 11) located in front of the SV. In other words, the processor 3300 may control the formation position of the light area (Light Area) to be formed at the rear side of the front vehicle 10 located closest to the SV among the front vehicles (10, 11).

Therefore, the lamp control system 3000 according to the embodiments may enhance visual field for the driver by controlling a formation position of the light area based on the distance to the front vehicle 10, and may prevent glare to the driver's eyes of the front vehicle 10.

Alternatively, the light area may be formed based on the driving speed of the SV. In other words, the processor 3300 may control the light area to be formed at a position far from the SV when the driving speed of the SV is relatively high. Alternatively, the processor 3300 may control the light area to be formed at a position close to the SV when the driving speed of the SV is relatively low.

Therefore, the lamp control system 3000 according to the embodiments has the effect of further enhancing the driver's field of view by controlling the formation position of the light area based on the speed of the driving vehicle.

Figure 5:
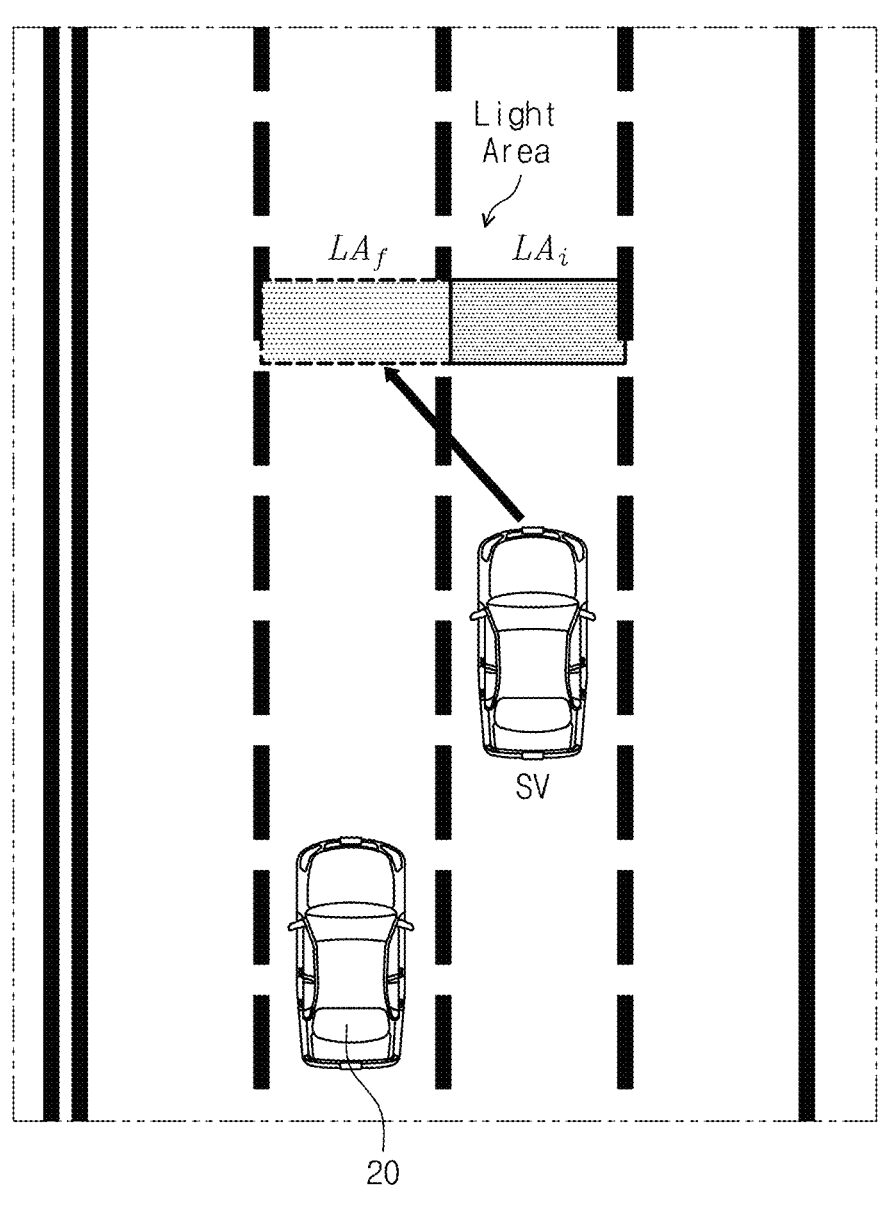
FIG. 5 is a diagram illustrating a method for controlling brightness distribution of a front area when changing lanes of a vehicle according to the embodiments of the present disclosure.
Figure 6:
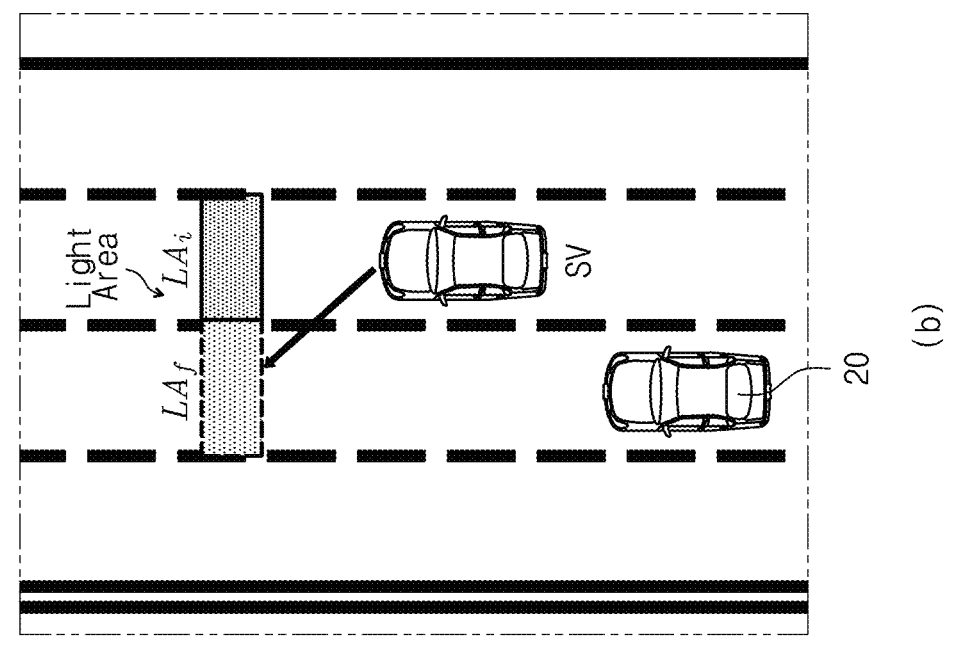
FIG. 6 is a diagram illustrating an example of a method for controlling brightness distribution of a front area when changing lanes of a vehicle according to the embodiments of the present disclosure.
Figure 6:
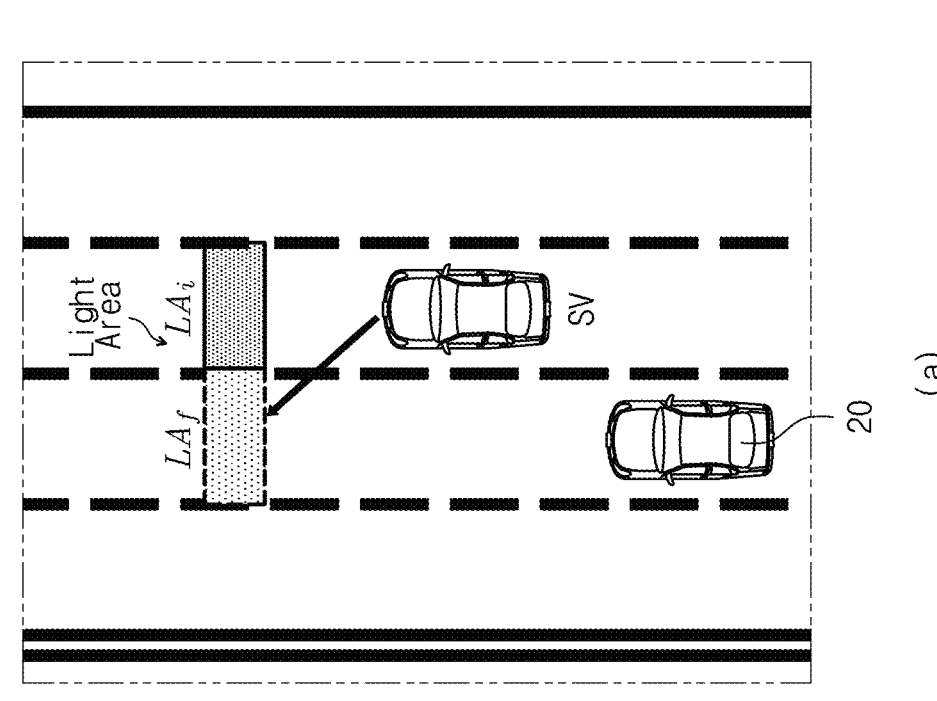

FIG. 5 is a diagram illustrating a method for controlling brightness distribution of the front area when changing lanes of the vehicle according to the embodiments of the present disclosure. FIG. 6 is a diagram illustrating an example of a method for controlling brightness distribution of the front area when changing lanes of the vehicle according to the embodiments of the present disclosure.

The subject vehicle (SV) illustrated in FIGS. 5 and 6 is a vehicle equipped with the lamp control system 3000, and the lamp control system 3000 may correspond to the lamp control system 3000 of FIG. 3, and the vehicle may correspond to the vehicle of FIGS. 1 and 2.

Referring to FIG. 5, upon receiving information indicating that a driving lane is changed, the processor 3300 may control the front area to include a destination lane corresponding to a target lane of the vehicle from among the driving lane and the lanes adjacent to the driving lane. That is, upon receiving information indicating that a driving lane is changed, the processor 3300 may control the light area indicating the front area where LV is formed to include not only a light area (LA$_i$) formed in the driving lane (which is a front area where LV is formed in the driving lane), but also a front area (hereinafter referred to a light area (LA$_f$) formed in the destination lane) where LV is formed in the destination lane. Information about the intention of the driver who attempts to change the driving lane may be determined based on information about whether the turn signal light is on, information about whether the vehicle approaches an adjacent lane of the vehicle, and the like.

In other words, as illustrated in FIG. 4, when the SV is driving without changing lanes, the front area where the LV is formed may include a light area (LA$_i$) formed in the driving lane and a light area (LA$_a$) formed in the adjacent lanes adjacent to the left and right of the driving lane. In addition, when the SV attempts to change lanes, as illustrated in FIG. 5, the front area where the LV is formed may include a light area (LA$_i$) formed in the driving lane and a light area (LA$_f$) formed in the destination lane.

The processor 3300 may control the amount of light of the lamp 3100 so that brightness of the light area (LA$_f$) formed in the destination lane from among the formed light areas is greater than brightness of the light area (LA$_i$) formed in the driving lane. More specifically, the processor 3300 may control the light amount of the lamp adjacent to the destination lane.

For example, as illustrated in FIG. 5, when the SV is driving on the third lane and wants to perform lane change from the third lane to the second lane, the processor 3300 may control the amount of light of the left lamp so that the brightness of the light area (LA$_f$) formed in the second lane is greater than the brightness of the light area (LA$_i$) formed in the third lane.

Therefore, the lamp control system 3000 according to the embodiments may control brightness of the light area formed in a target lane to be relatively bright, and may provide the driver of the rear vehicle 20 located behind the SV with information about the situation in which the driver of the SV attempts to change from a current lane to another lane.

In addition, the processor 3300 may control brightness distribution of the light area (LA$_f$) formed in the destination lane based on the driver's lane change tendency information. As described with reference to FIG. 3, the driver's lane change tendency information is the tendency of the driver who desires to change lanes, and may be set based on the turn signal light signal information or the time taken for such lane change.

For example, the driver's lane change tendency information may be classified into caution type/normal type/safety type based on the turn signal light signal information, the time taken for lane change, and/or a combination thereof.

For example, if the lane information reception value changes without lighting on the turn signal light in normal times or if lane change is performed within 3 seconds after the turn signal light is turned on, the driver may be determined to be a caution-type driver.

When the driver is a caution-type driver, the processor 3300 may control brightness distribution of the light area (LA$_f$) formed in a target lane (i.e., a destination lane) to be increased (i.e., to have high brightness) as shown in FIG. 6 (a), because the driver's lane change speed is relatively high and there is a need for the SV's driver to notify a driver of the following vehicle (located behind the SV) of the lane change situation of the SV.

Alternatively, for example, if it takes 6 seconds or more for the lane to change after the turn signal is turned on in normal times, the driver may be determined to be a safe-type type driver. When the driver is the safe-type driver, the processor 3300 may control brightness distribution of the light area (LA$_f$) formed in a target lane (i.e., a destination lane) to be reduced (i.e., to have low brightness) as shown in (b) of FIG. 6, because the driver's lane change speed is relatively low and there is relatively little need to notify the driver of the following vehicle (i.e., the rear vehicle) of the lane change situation.

Alternatively, for example, if the lane is changed within 3 to 6 seconds after the turn signal is turned on in normal times, the driver may be determined to be a normal-type driver. When the driver is a normal-type driver, the processor 3300 may control brightness distribution of the light area (LA$_f$) formed in a target lane (i.e., a change lane) to be smaller than in the case of the caution-type driver and larger than in the case of the safe-type driver, because the driver's lane change speed is normal and it is usually necessary to notify the driver of the following vehicle (i.e., the rear vehicle) of the lane change situation.

Therefore, the lamp control system 3000 according to the embodiments may efficiently inform the driver of the following vehicle (i.e., the rear vehicle) of the lane change situation by controlling brightness distribution of the light area (LA$_f$) formed in a target lane for each driver according to the driver's lane change speed tendency.

In addition, the processor 3300 may also control the brightness change speed of the light area (LA$_f$) formed in a target lane for each driver according to the driver's lane change speed tendency. For example, the processor 3300 may control the brightness change speed of the light area (LA$_f$) formed in the target lane to be adjusted depending on the driver's lane change tendency. In more detail, the processor 3300 may control the brightness change speed of the light area (LA$_f$) formed in the target lane in a situation where the driver is the caution-type driver to be higher than the brightness change speed of the light area (LA$_f$) formed in the target lane in another situation where the driver is the safe-type driver.

Therefore, the lamp control system 3000 according to the embodiments may effectively inform the driver of the rear vehicle of the lane change situation by controlling the brightness change speed of the light area (LA$_f$) formed in a target lane for each driver according to the driver's lane change speed tendency.

Figure 7:
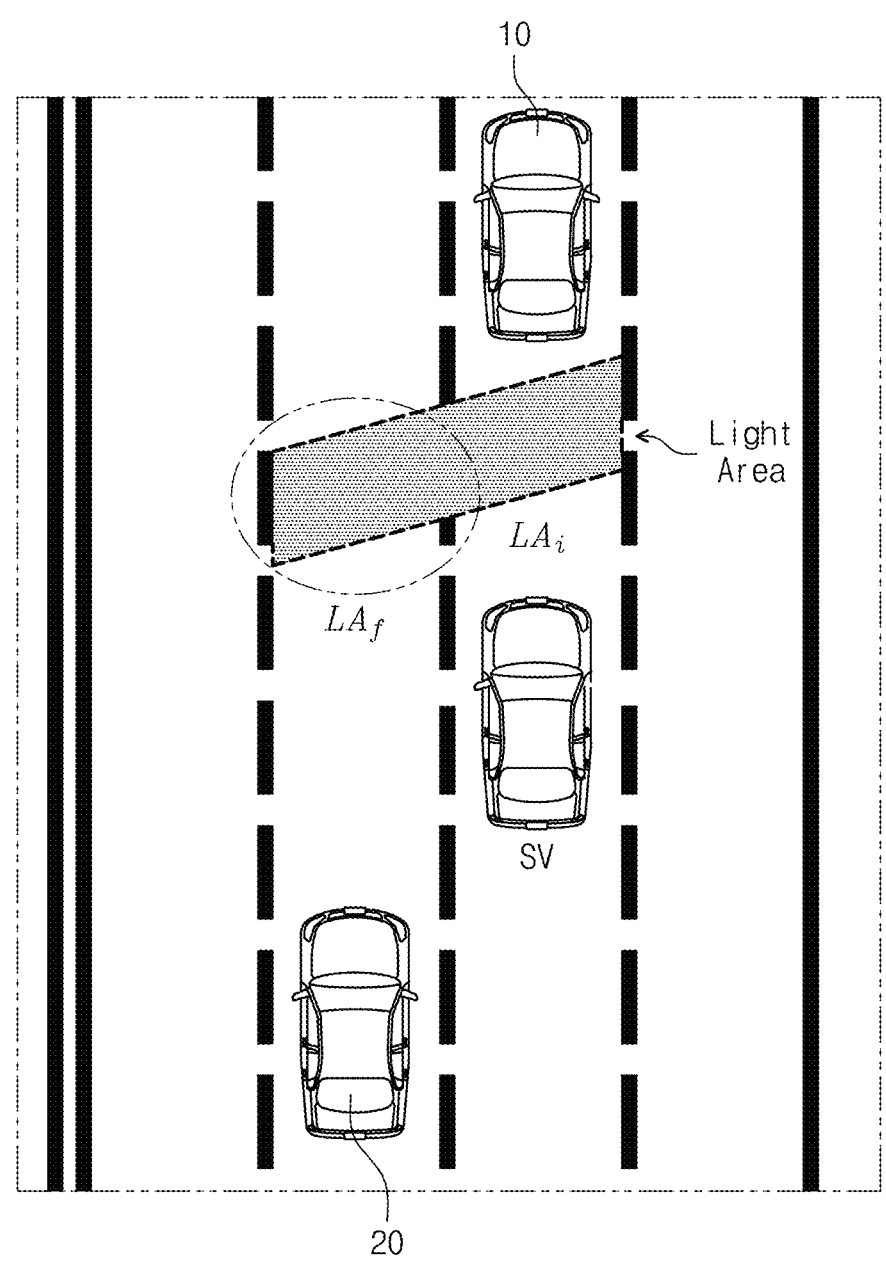
FIG. 7 is a diagram illustrating a method for controlling a formation position of a front area when changing lanes of a vehicle according to the embodiments of the present disclosure.
Figure 8:
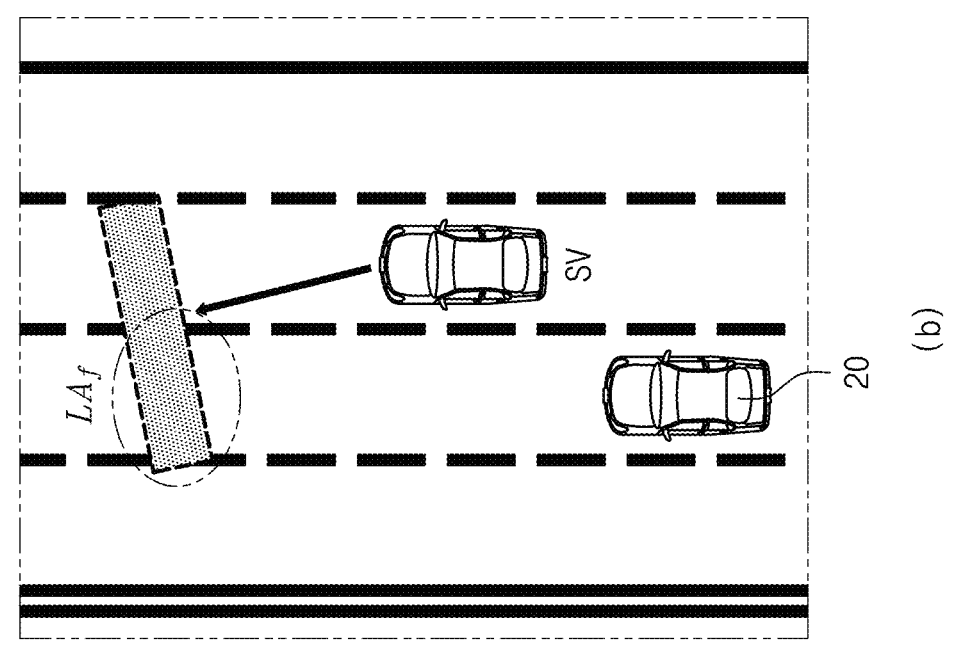
FIG. 8 is a diagram illustrating an example of a method for controlling a formation position of a front area when changing lanes of a vehicle according to embodiments.
Figure 8:
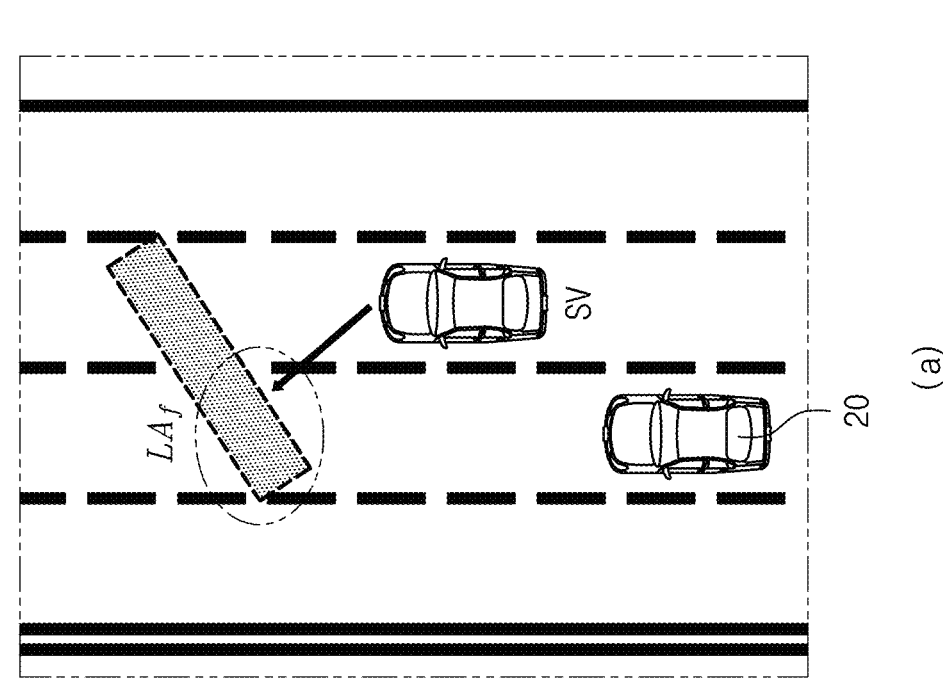

FIG. 7 is a diagram illustrating a method for controlling a formation position of the front area when changing lanes of a vehicle according to the embodiments of the present disclosure. FIG. 8 is a diagram illustrating an example of a method for controlling a formation position of the front area when changing lanes of a vehicle according to embodiments.

The subject vehicle (SV) illustrated in FIGS. 7 and 8 is a vehicle equipped with the lamp control system 3000, and the lamp control system 3000 may correspond to the lamp control system 3000 of FIG. 3, and the vehicle may correspond to the vehicle illustrated in FIGS. 1 and 2.

Referring to FIG. 7, upon receiving information indicating that a driving lane is changed, the processor 330 may control a beam pattern of the lamp 3100 so that a formation position of the light area (LA$f$) formed in a target lane is located closer to the SV than the formation position of the light area (LA$i$) formed in the driving lane.

For example, as illustrated in FIG. 7, in a situation where the SV is driving on the third lane and attempts to change from a current lane (i.e., the driving lane) to the second lane, the processor 3300 may control the beam pattern of the lamp 3100 so that the formation position of the light area (LA$_f$) formed in the second lane is located closer to the SV than the formation position of the light area (LA$_i$) formed in the third lane.

FIG. 7 illustrates an example in which the formation position of the light area (LA$_f$) formed in the target lane is located closer to the SV than the formation position of the light area (LA$_i$) formed in the driving lane by varying the slope of the light area to be formed.

The example of FIG. 7 is only an example, and the scope of the present disclosure is not limited thereto. In more detail, unlike FIG. 7 where the formation position of the light area (LA$_f$) formed in the target lane and the formation position of the light area (LA$_i$) formed in the driving lane are integrated into a single shape, the processor 3300 may control the formation position of the light area (LA$_f$) formed in the target lane and the formation position of the light area (LA$_i$) formed in the driving lane to be independently located.

Therefore, the lamp control system 3000 according to the embodiments may control the formation position of the light area formed in a target lane to be located closer to the SV, and may thus provide the driver of the rear vehicle 20 located behind the SV of lane change situation information indicating that the driver of the SV attempts to change lanes.

When the processor 3300 controls the formation position of the light area (LA$_f$) formed in the target lane and the formation position of the light area (LA$_i$) formed in the driving lane, the processor 3300 may control the formation positions by considering the positions of the front vehicle 10 and the rear vehicle 20. That is, the processor 3300 may control the formation position of the light area (LA$_f$) formed in the target lane and the formation position of the light area (LA$_i$) formed in the driving lane in order to prevent damage caused by light to the driver of the front vehicle 10 and the driver of the rear vehicle 20, but may control the formation position of the light area (LA$_f$) and the formation of the light area (LA$_i$) so as not to interfere with the front vehicle 10 and the rear vehicle 20.

In addition, the processor 3300 may control the formation position of the light area (LA$_f$) formed in the target lane based on the driver's steering tendency information. As described with reference to FIG. 3, the driver's steering tendency information is a tendency indicating the steering angle of the steering wheel operated by the driver, and may be set based on the frequency of the driver's lane departure when driving on a curved road and/or the steering angle information with respect to the lane when driving on a curved road.

For example, the driver's lane change tendency information is a tendency indicating a steering angle of the steering wheel operated by the driver, and may be classified into caution type/normal type/safe type based on the frequency of the driver's lane departure when driving on a curved road, the steering angle information with respect to the lane when driving on a curved road, and/or a combination thereof.

For example, if a difference in steering angle between the lane and the vehicle (i.e., SV) is 7 degrees or more when the SV is driving on a curved road in normal times, the driver of the SV may be determined to be a caution-type driver. If the driver is a caution-type driver, the processor 3300 may control the formation position of the light area (LA$_f$) formed in the target lane to be located closer to the SV as shown in FIG. 8($a$), because the degree of manipulation of the steering wheel by the driver is large (i.e., the SV enters at a sharp angle when changing lanes) and the need to inform the driver of the rear vehicle of the lane change situation is relatively large.

Alternatively, for example, if a difference in steering angle between the lane and the vehicle is 0 to 3 degrees when driving on a curved road in normal times, the driver may be determined to be a safe-type driver. When the driver is determined to be the safe-type driver, the degree of manipulation of the steering wheel by the driver is small (i.e., the SV of the driver enters at a gentle angle when changing lanes), and there is relatively little need to inform the driver of the rear vehicle of the lane change situation, so that the processor 3300 may control the formation position of the light area (LA$_f$) formed in the target lane to be located far from the SV as shown in FIG. 8($b$).

Alternatively, for example, if a difference in steering angle between the lane and the vehicle is 3 to 7 degrees when driving on a curved road in normal times, the driver may be determined to be a normal-type driver.

When the driver is determined to be a safe-type driver, the degree of manipulation of the steering wheel by the driver is normal (i.e., the SV of the driver enters at an appropriate angle when changing lanes), and there is relatively normal need to inform the driver of the rear vehicle of the lane change situation, so that the processor 3300 may control the formation position of the light area (LA$_f$) formed in the target lane to be located farther away from the SV than in the caution-type driver, and may control the formation position of the light area (LA$_f$) formed in the target lane to be located closer to the SV than in the safety-type driver.

Therefore, the lamp control system 3000 according to the embodiments may effectively inform the driver of the rear vehicle of the lane change situation by controlling the formation position of the light area (LA$_f$) formed in the target for each driver according to the driver's steering angle tendency when the SV of the driver changes lanes.

In addition, the processor 3300 may control the speed of change in the position of the light area (LA$_f$) formed in the target lane for each driver according to the driver's steering operation angle tendency. For example, the processor 3300 may control the speed of change in the position of the light area (LA$_f$) formed in the target lane in the case of the caution-type driver to be higher than the speed of change in the position of the light area (LA$_f$) formed in the target lane in the case of the safe-type driver according to the driver's steering operation angle tendency.

Therefore, the lamp control system 3000 according to the embodiments can efficiently notify the driver of the rear vehicle of the lane change situation by controlling the speed of change in the position of the light area (LA$_f$) formed in the target lane for each driver according to the driver's steering operation angle tendency.

Figure 9:
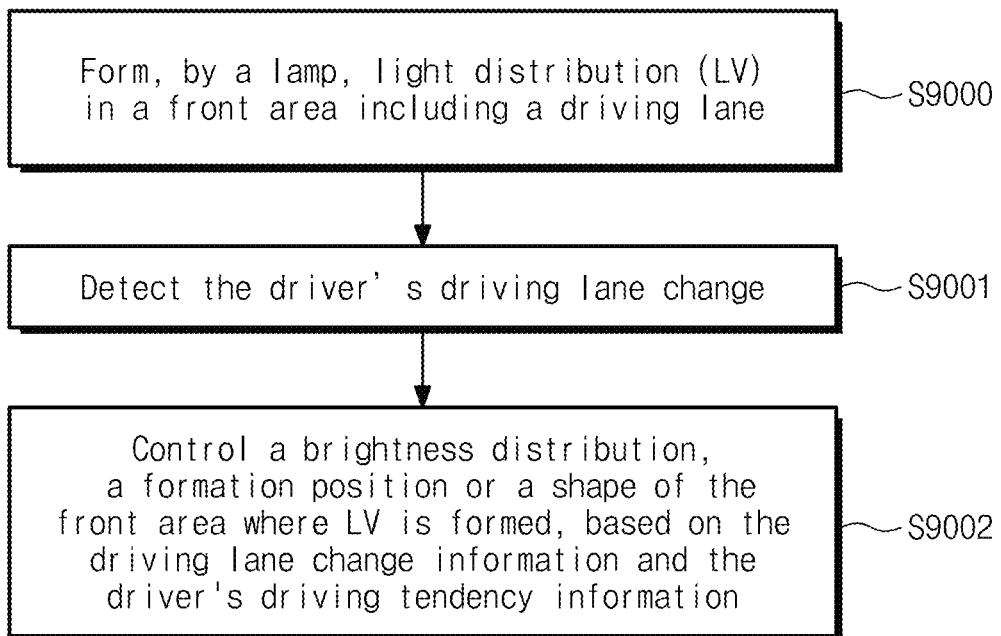
FIG. 9 illustrates a lamp control method according to embodiments.

FIG. 9 is a flowchart illustrating a lamp control method according to the embodiments of the present disclosure.

FIG. 9 illustrates a method for allowing the vehicle of FIGS. 1 and 2 and the lamp control system 3000 of FIG. 3 to control the lamps using an autonomous driving integrated controller 600 of FIG. 1 and the processor 3300 of FIG. 3, etc.

Referring to FIG. 9, the lamp control method according to the embodiments may include forming (S9000), by a lamp, a light distribution (LV) in a front area including a driving lane by a lamp; detecting (S9001) a change in a driving lane of a vehicle, and controlling (S9002) a brightness distribution, a formation position, or a shape of the front area where the LV is formed based on driving lane change information and driver's driving tendency information.

The forming (S9000) the LV may be performed by the lamp 3100 of the lamp control system 3000. The detecting (S9001) may be performed by the sensing module 3200 of the lamp control system 3000. The controlling (S9002) may be performed by the processor 3300 of the lamp control system 3000.

Upon receiving information about the driving lane change, the controlling (S9002) may control the front area to include a target lane among adjacent lanes of the driving lane. In addition, the controlling (S9002) may control brightness of an area where an LV is formed in the target lane based on the driver's lane change tendency information, or may control the formation position of the area where an LV is formed in the target lane based on the driver's steering tendency information.

Therefore, the lamp control method according to the embodiments can efficiently notify the driver of the rear vehicle of the lane change situation by controlling the brightness, formation position, and shape of the area where the LV is formed in a target lane for each driver according to the driver's driving tendency.

The embodiments have been described from the perspectives of the method and/or apparatus, and the description of the method and apparatus may be mutually complementary and applicable.

While each drawing has been explained separately for the sake of clarity, it is also possible to design new embodiments by combining the embodiments illustrated in each drawing. Designing a computer-readable recording medium having recorded thereon a program for executing the above-described embodiments as needed by an ordinary skilled person falls within the scope of the present disclosure. The device and method according to the embodiments are not be limited to the configurations and methods in the above-described embodiments. Instead, the embodiments may be selectively combined in whole or in part to allow for various modifications. While preferred embodiments of the present disclosure have been illustrated and explained, the present disclosure is not limited to the specific embodiments described above. In addition, those skilled in the art will appreciate that various modifications may be made in the embodiments without departing from the essence of the embodiments claimed in the claims. These variations should not be individually understood apart from the technical concept or perspective of the embodiments.

Various components of the apparatus according to the embodiments may be implemented by hardware, software, firmware, or a combination thereof. Various components of the embodiments may be implemented as a single chip such as a hardware circuit, for example. According to embodiments, the components of the embodiments may be implemented as separate chips. According to embodiments, at least one or more of the components of the apparatus according to the embodiments may include one or more processors capable of executing one or more programs. The one or more programs may perform one or more of the operations/methods according to embodiments or include instructions for performing the same. Executable instructions for performing the methods/operations of the apparatus according to the embodiments may be stored in a non-transitory computer-readable medium (CRM) or other computer program products configured to be executed by the one or more processors. Alternatively, the instructions may be stored in a transitory CRM or other computer program products configured to be executed by the one or more processors. The concept of memory according to embodiments may encompass not only a volatile memory (e.g., random-access memory (RAM)) but also a non-volatile memory, a flash memory, a programmable read-only memory (PROM), and the like. The memory may also be implemented in the form of carrier waves, such as transmission over the Internet. Furthermore, a processor-readable recording medium may be distributed to computer systems connected over a network, where processor-readable code may be stored and executed in a distributed manner.

In this document, "/" and "," are interpreted as "and/or." For example, "A/B" is interpreted as "A and/or B," and "A, B" is interpreted as "A and/or B." In addition, "A/B/C" means "at least one of A, B, and/or C." Similarly, "A, B, C" also means "at least one of A, B, and/or C." Furthermore, "or" is interpreted as "and/or." For example, "A or B" may mean: 1) "A" only, 2) "B" only, or 3) "A and B." In other words, "or" in this document may mean "additionally or alternatively."

Terms such as "first" and "second" may be used to describe various components of the embodiments. However, the various components according to the embodiments should not be limited by the interpretation of these terms. These terms are merely used to distinguish one component from another. For example, a first user input signal and a second user input signal are both user input signals, but unless clearly indicated in context, the first user input signal and second user input signal do not refer to the same user input signals.

The terms used to describe the embodiments are used for the purpose of describing specific embodiments. In other words, the terms are not intended to limit the embodiments. As described in the embodiments and claims, the singular form is intended to encompass the plural unless explicitly specified in context. The "and/or" expression is used to mean all possible combinations of terms. The terms such as "includes" or "comprises" are used to describe the presence of features, numbers, steps, elements, and/or components and does not imply the exclusion of additional features, numbers, steps, elements, and/or components. Condition expressions such as "if" and "when" used to describe embodiments are not limited to optional cases but are intended to be interpreted to mean that when specific conditions are satisfied, related operations or definitions are performed or interpreted.

The operations according to embodiments described in this document may be performed by a transmitting/receiving device, which includes a memory and/or a processor according to embodiments. The memory may store programs for performing/controlling the operations according to the embodiments, and the processor may control various operations described in this document. The processor may also be referred to as a controller. The operations according to the embodiments may be performed by firmware, software, and/or a combination thereof. The firmware, software, and/or combination thereof may be stored in the processor or memory.

On the other hand, the operations according to the embodiments may also be performed by a transmitting device and/or a receiving device according to embodiments. The transmitting/receiving device may include a transceiver for transmitting and receiving media data, a memory for storing instructions (e.g., program code, algorithms, flow-charts, and/or data) for processes according to embodiments, and a processor for controlling the operations of the trans-mitting/receiving device.

The processor may be referred to as a controller. The processor may correspond to hardware, software, and/or a combination thereof. The operations according to the embodiments may be performed by the processor. Addition-ally, the processor may be implemented as an encoder/decoder for the operations according to the embodiments.

Hereinabove, the best mode for implementing the embodiments has been described.

As described above, the embodiments may be applied in whole or in part to an autonomous valet driving apparatus and system.

Those skilled in the art may make various modifications or variations to the embodiments without departing from the scope of the present disclosure.

The embodiments may include modifications/variations without departing from the scope of the claims and their equivalents.

As is apparent from the above description, the embodi-ments of the present disclosure can reduce power consump-tion of unnecessary lamps by efficiently controlling light distribution according to the driver's driving tendency, thereby reducing energy consumption.

In addition, according to the embodiments, there is an effect of preventing accidents between vehicles by control-ling light distribution irradiated to the destination lane when changing lanes, thereby conveying the driver's driving intention to the following vehicle.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. A lamp control system comprising:
a lamp configured to form a light distribution (LV) in a front area including a driving lane;
a sensing module configured to detect a change in the driving lane of a vehicle; and
a processor configured to control the lamp so that a brightness distribution, a formation position, or a shape of the front area where the light distribution (LV) is formed is variable based on information about a driving lane change and information about a driver's driving tendency.

2. The lamp control system according to claim 1, wherein: the processor is configured to:
upon receiving the driving lane change information, con-trol the front area to include a target lane corresponding to a destination lane from among adjacent lanes of the driving lane.

3. The lamp control system according to claim 2, wherein the processor is configured to:
control brightness of an area where the LV is formed in the target lane to be greater than brightness of the area where the LV is formed in the driving lane.

4. The lamp control system according to claim 2, wherein the processor is configured to:

control brightness distribution of an area where the LV is formed in the target lane based on driver's lane change tendency information among the driver's driving ten-dency information.

5. The lamp control system according to claim 4, wherein: the driver's lane change tendency information is deter-mined based on a lighting-on signal of a turn signal light or a time taken for lane change.

6. The lamp control system according to claim 2, wherein the processor is configured to:
control an area where the LV is formed in the target lane to be positioned closer to the vehicle than the area where the LV is formed in the driving lane.

7. The lamp control system according to claim 2, wherein the processor is configured to:
control a formation position of an area where the LV is formed in the target lane, based on driver's steering tendency information from among the driver's driving tendency information.

8. The lamp control system according to claim 7, wherein: the driver's steering tendency information is determined based on either a frequency of a driver's lane departure when driving on a curved road or steering angle infor-mation with respect to the driving lane when driving on the curved road.

9. The lamp control system according to claim 1, wherein the processor is configured to additionally control:
the brightness distribution, the formation position, or the shape of the front area where the LV is formed, based on a distance between the vehicle and a front vehicle, a distance between the vehicle and a rear vehicle, or a driving speed of the vehicle.

10. A lamp control method comprising:
forming, by a lamp, a light distribution (LV) in a front area including a driving lane;
detecting, by a sensing module, a change in the driving lane of a vehicle; and
controlling, by a processor, a brightness distribution, a formation position, or a shape of the front area where the LV is formed based on information about a driving lane change and information about a driver's driving tendency.

11. The lamp control method according to claim 10, wherein the controlling includes:
upon receiving the driving lane change information, using the processor to control the front area to include a target lane corresponding to a destination lane from among adjacent lanes of the driving lane.

12. The lamp control method according to claim 11, wherein the controlling includes using the processor to:
control brightness distribution of an area where the LV is formed in the target lane based on driver's lane change tendency information among the driver's driving ten-dency information.

13. The lamp control method according to claim 11, wherein the processor is configured to:
control the formation position of an area where the LV is formed in the target lane based on driver's steering tendency information from among the driver's driving tendency information.

14. A vehicle comprising:
a lamp configured to form a light distribution (LV) in a front area including a driving lane;
a sensing module configured to detect a change in the driving lane of the vehicle; and
a processor configured to control the lamp so that a brightness distribution, a formation position, or a shape of the front area where the light distribution (LV) is formed is variable based on information about a driving lane change and information about a driver's driving tendency.

* * * * *